July 31, 1962  O. A. SEUBERT  3,046,811

VALVE WHEEL HANDLE

Filed Jan. 29, 1960

*INVENTOR.*
OSCAR ANTON SEUBERT
BY

Reuben Wolk
ATTORNEY

United States Patent Office 3,046,811
Patented July 31, 1962

3,046,811
VALVE WHEEL HANDLE
Oscar Anton Seubert, 4037 Annapolis Ave., Dayton, Ohio
Filed Jan. 29, 1960, Ser. No. 5,433
1 Claim. (Cl. 74—557)

This invention relates to a means for the operation of a valve, and more particularly to a handle which may be mounted on a valve wheel in accordance with the desired functions thereof.

In boiler rooms, power plants, machine shops, ships, and engine rooms, pressure systems are frequently employed utilizing such fluids as steam, water and air. The necessity for leakproofing these systems requires extremely tight packing, and consequently any valves used in connection with these systems require great force to open and close. This is usually accomplished by using large diameter wheels as valve handles, since these wheels supply the additional force necessary for the opening and closing operations. In some instances, a little extra torque is required to "crack" the valve, and supplementary handles have been employed as extra levers for many years to provide this extra torque, such as the device disclosed in U.S. Patent No. 1,460,922, issued to Saunders on July 3, 1923. Such a handle may be clamped to the peripheral portion of the wheel and the operator, by grasping the handgrip of the device, can exert the additional torque through the wheel and to the valve itself. All the prior art devices, however, have suffered several common deficiencies; the primary of which is the necessary protrusion of the handle beyond the periphery of the wheel. This results in interference with adjacent wheels or other members, and if the handle happens to be projecting downwardly of the wheel it often leads to serious accidents when personnel have blundered into this protruding member. Another disadvantage of the prior art handles lies in their lack of versatility, since a handle such as the above-mentioned prior art device is designed for a fixed location with respect to the wheel. In other words, such a handle, designed to provide extra torque, could not be easily used for "spinning" the wheel after the initial motion, since the spinning motion requires the handle to be at right angles to the plane of the wheel. A further deficiency in such a design lies in the fact that each handle must be designed for a given wheel and cannot be varied for other sizes thereof.

The present invention is intended as an improvement over the valve wheel handles of the prior art, since it overcomes the disadvantages outlined above. The result is a device of great utility, versatility, and simplicity, provided by a novel structure permitting the handle to be selectively placed for maximum torque, to be swung out of the way without removing it or to place it at right angles to the wheel to permit "spinning." Not only can the handle be rotated to provide the above positions, but it can be locked in any of these positions; or, if desired, the handle may be initially locked in any of these positions without permitting any rotation. Further, the handle is capable of simple adjustment to permit its use on wheels having a wide variation in cross section of the outer ring or rim thereof.

It is a principal object of this invention to provide an improvement to valve wheels that permit considerable initial torque to the wheel.

It is a further object to provide such a device that can be swung out of its maximum torque position and to locate it within the wheel for storage when not in use.

Another object of the invention is to provide a handle that can be placed halfway between the other positions to provide a "spinning" effect to the wheel.

Still another object of the invention is to provide means for locking said handle in position if desired, in lieu of the rotatability thereof.

Another object is the provision of means for locking said handle still more firmly in place.

A further object is the provision of means by which the handle may be adjusted for wheel rims of different diameters.

Another object is the provision of a handle that is simple to operate and can provide all the above functions with a minimum of adjustment.

These and other objects of the invention will be more readily understood from the following description, claims, and drawings, in which:

Figure 1:
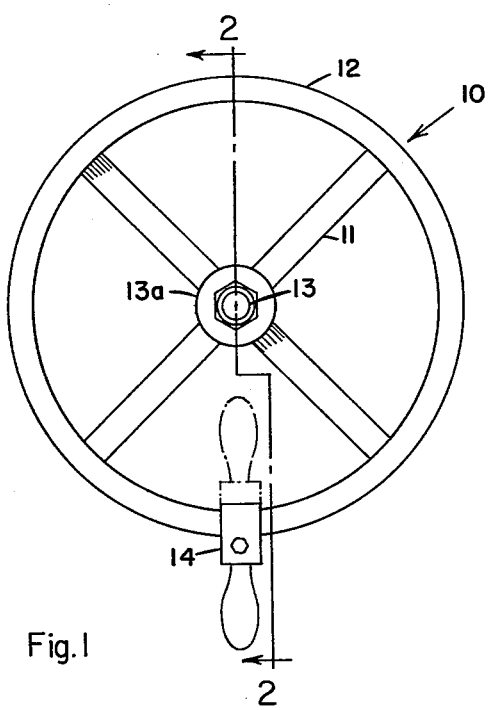
FIGURE 1 is an elevational view of the novel handle mounted on a wheel illustrating its maximum torque position in solid and its storage position in phantom.
Figure 2:
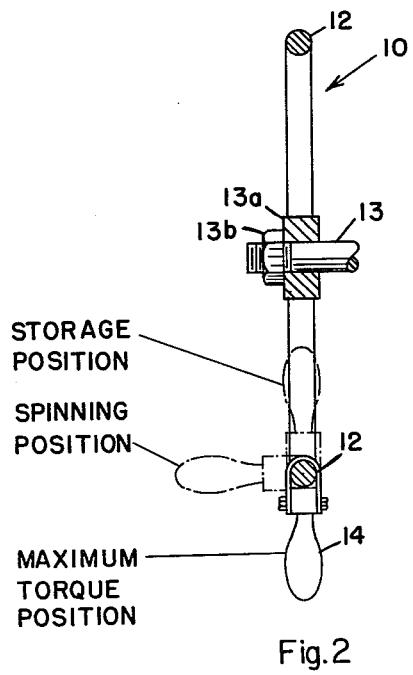
FIGURE 2 is a view taken along line 2—2 of FIGURE 1 illustrating the handle in both FIGURE 1 positions, and also in its "spinning" position in phantom.
Figure 3:
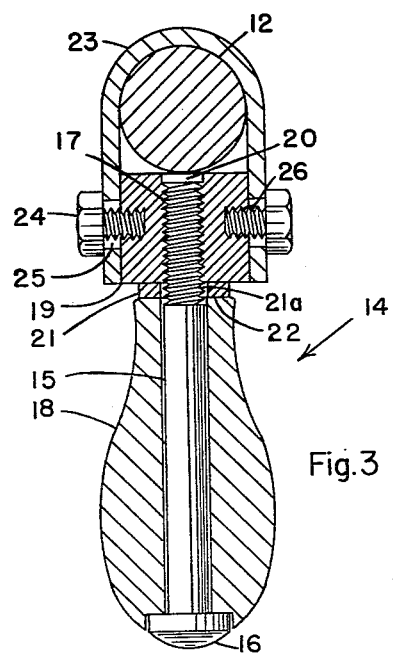
FIGURE 3 is a sectional view of the novel handle, viewed similarly to FIGURE 2.
Figure 4:
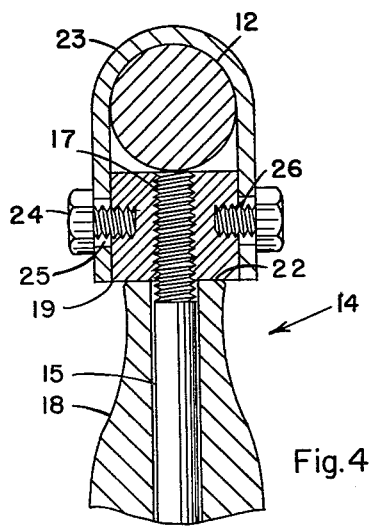
FIGURE 4 is a view similar to FIGURE 3, illustrating the handle in its optional locked position.

Referring now to the drawings, the valve wheel 10 is illustrated in FIGURES 1 and 2 and consists of spokes 11 and a rim 12, the wheel being mounted upon a shaft 13 against its hub 13a by means of nut 13b. A preferred form of the novel handle 14 is illustrated in FIGURES 3 and 4, where it can be seen that the handle includes a bolt 15 whose outer end 16 is shaped like a thumbscrew for ease in grasping, and whose inner end 17 is threaded. The end 16 may, if desired, have a hexagonal or slotted head. A handgrip 18 is mounted loosely upon the bolt 15 so that it is free to rotate around the bolt.

The inner end 17 of the bolt is threaded and is inserted into a rectangular block 19 which has a similarly threaded recess 20 which mates with the end 17. The recess passes entirely through the block, as shown in the drawings, but the bolt is prevented from passing through the entire depth of the recess by means of a spacer 21 which is mounted between the block 19 and the inner end 22 of the handgrip. The spacer has an opening 21a in its center through which the bolt passes. Mounted on the block 19 is a U-shaped clamp 23 which is secured to the sides of the block by a bolt 24 in each side. The bolts pass through slots 25 in the clamp and engage with threaded recesses 26 in the block to hold the clamp tightly to the block. As shown in the drawings, the loop portion of the clamp is curved to pass around the run 12 of the wheel and encircle it.

Operation

When it is desired to mount the handle on the wheel 10, the bolts 24 are removed, the clamp 23 is placed about a convenient portion of the rim 12, and it is then re-fastened to the block 19 by placing the bolts through slots 25 in the clamp and in the recesses 26 in the block. The slots 25 are elongated in a direction which is radial of the wheel, so that the clamp may be used on wheel rims of varying diameters merely by locating the bolts 24 in the appropriate portion thereof. This, of course, locates the block nearer to or farther from the rim. The next step in assembling the handle involves placing the spacer 21 upon the inner end 22 of the handgrip 18, passing the bolt 15 through the central aperture in the handgrip and the opening 21a in the spacer, then threading the end 17 of the bolt into the threaded recess 20 of the block 19. By turning thumbscrew 16, the entire assembly is locked together with the block exerting exactly enough frictional force upon the rim 12 to lock the handle in any position in which it is placed, yet permit the handle to be rotated about the rim with the exertion of a little effort. It is obvious that by changing the depth of the block 19, the assembly can be utilized on rims of varying diameters, and thus it is only necessary to provide such blocks where depths vary, yet with other dimensions identical to provide interchangeability in the handle assembly.

With the handle assembled, it may be assumed first that it is to be used first to "crack" the valve wheel open, which requires maximum torque. This is the solid position shown in FIGURES 1 and 2. Since the handle extends outward of the wheel, the handgrip may be grasped and an initial effort applied to rotate the wheel about the shaft 13. After the wheel is sufficiently free, the operator may swing the handle about the rim by pivoting the clamp 23 about the rim. By the frictional engagement of the block against the rim, the handle will remain in this "spinning" position at right angles to the plane of the wheel (FIGURE 2), at which time the operator may again grasp the handgrip and rapidly rotate the wheel. This is an operation analogous to the spinning of an automobile wheel when removing lug nuts. The procedure is, of course, simplified by the fact that the handgrip is free to rotate about the bolt.

After the wheel has been rotated to its maximum valve open position, the handle is then swung out of the way by pivoting it an additional 90 degrees about the rim, so that it is now 180 degrees pivoted from its maximum torque position. This "storage" position of the handle is illustrated in phantom in FIGURES 1 and 2. Again the frictional engagement locks the handle in this position, where it is clear of interference with adjacent structure and also avoids painful injuries which might otherwise occur if personnel should blunder into it in its protruding position.

When it is desired to again close the valve, the handle is again swung out to maximum torque position, and the previously described procedure is repeated with the direction of rotation of the wheel being reversed.

FIGURE 4 illustrates a variation of the invention in which the novel handle is utilized as a stationary device, in the event still more torque is desired or if for some reason the handle is to be always left in any of the positions discussed above. In this modification, the spacer 21 has been removed from the assembly, with the result that the inner end 17 of the bolt is in direct contact with the outer peripheral surface of the rim 12. This provides an even greater frictional interlock between the handle and the wheel when the thumbscrew is tightened down as before. If it is desirable to provide an even tighter locking arrangement with the rim, it is only necessary to drill a shallow hole in the outer periphery of the rim to align with the inner end 17 of the bolt. The bolt will then be slightly recessed into the rim and thus provide the added fastening.

Other changes may be made in the novel device without departing from the spirit of the invention.

I claim:

A valve actuating means including a wheel and a handle, said handle comprising a U-shaped clamp encircling the rim of said wheel, a solid block mounted between the sides of and cooperating with said clamp to provide engagement with said rim, removable attaching means mounting said block on said clamp, a bolt threadably engaged in said block, a handgrip loosely mounted on said bolt, and a spacer mounted on said bolt between said block and said handgrip in alignment with the major axis of said rim, said block and clamp engaging said rim sufficiently closely to permit said handle to remain in any predetermined position relative to the plane of the wheel, yet permitting rotation of said entire handle to attain any other position relative to said plane.

References Cited in the file of this patent

UNITED STATES PATENTS

| | | |
|---|---|---|
| 1,141,281 | Spencer | June 1, 1915 |
| 1,503,248 | Bruhn | Aug. 20, 1923 |
| 2,267,308 | Russell et al. | Aug. 29, 1940 |

FOREIGN PATENTS

| | | |
|---|---|---|
| 401,191 | France | Aug. 20, 1909 |